(12) United States Patent
Raghavan et al.

(10) Patent No.: US 9,489,413 B2
(45) Date of Patent: Nov. 8, 2016

(54) ASYNCHRONOUS GLOBAL INDEX MAINTENANCE DURING PARTITION MAINTENANCE

(71) Applicant: Oracle International Corporation, Redwood Shores, CA (US)

(72) Inventors: Ananth Raghavan, San Francisco, CA (US); George Eadon, Hollis, NH (US); Ramesh Kumar, Foster City, CA (US); Hermann Baer, San Mateo, CA (US); Suresh Sridharan, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 345 days.

(21) Appl. No.: 14/231,438

(22) Filed: Mar. 31, 2014

(65) Prior Publication Data
US 2015/0278327 A1    Oct. 1, 2015

(51) Int. Cl.
*G06F 17/30* (2006.01)
*G06F 9/46* (2006.01)

(52) U.S. Cl.
CPC ......... *G06F 17/30339* (2013.01); *G06F 9/466* (2013.01)

(58) Field of Classification Search
None
See application file for complete search history.

(56) References Cited

U.S. PATENT DOCUMENTS

| | | | | |
|---|---|---|---|---|
| 5,873,103 A | * | 2/1999 | Trede | G06F 3/0617 |
| 7,356,549 B1 | * | 4/2008 | Bruso | G06F 17/30327 |
| | | | | 707/696 |
| 2006/0242163 A1 | * | 10/2006 | Miller | G06F 12/0875 |
| 2007/0276779 A1 | * | 11/2007 | Baker | G06F 17/3051 |
| 2013/0145350 A1 | * | 6/2013 | Marinescu | G06F 17/30563 |
| | | | | 717/128 |
| 2013/0173553 A1 | * | 7/2013 | Apte | G06F 7/00 |
| | | | | 707/640 |

OTHER PUBLICATIONS

TCL Commands—Commit, Rollback and Savepoint, Jun. 21, 2013, pp. 1-3.*
Foote, 12c Asynchronous Global Index Maintenance Parts I-III, Aug. 2013, pp. 1-33.*
Foote, Differences Between Unique and Non-Unique Indexes Part IV (Take It Back), Mar. 25, 2009, pp. 1-9.*
Rajesh, Asynchronous Global Index Maintenance 12c Part II, Dec. 26, 2013, pp. 1-5.*
Shamsudeen, Oracle Database 12c review: Finally, a true cloud database, Javaworld, Jun. 26, 2013, pp. 1-6.*
Kyte, On Oracle Database 12c, Oracle Magazine, Part 3, Feb. 2014, pp. 1-8.*

(Continued)

Primary Examiner — Albert Phillips, III
(74) Attorney, Agent, or Firm — Hickman Palermo Becker Bingham LLP; Daniel D. Ledesma

(57) ABSTRACT

Techniques for maintaining a global index in response to a partition being dropped are provided. In response to an instruction to drop a partition, partition identification data that identifies the partition is stored. Index entries, in the global index, that correspond to the dropped partition become "orphaned" entries. Later, an execution plan for a query is processed, where the execution plan targets a global index. During execution of the execution plan, one or more index entries are accessed. For each accessed index entry, the partition identification data is analyzed to determine if the index entry is an orphaned entry. If so, then the index entry is ignored for purposes of the query. Later, the global index may be updated to delete each orphaned entry. Such deletion may occur much later, such as during a time when the database is not queried or updated frequently.

24 Claims, 4 Drawing Sheets

(56) References Cited

OTHER PUBLICATIONS

Asynchronous Global Index Maintenance for Drop and Truncate Partition Oracle Database 12C release 1 (12.1), Oct. 23, 2013, pp. 1-4.*

Hussain, Oracle Database 12c New Features—Part 2, Jul. 3, 2013, pp. 1-20.*

Oracle® Database VLDB and Partitioning Guide, 11g Release 2 (11.2), "Maintaining Partitions", http://docs.oracle.com/cd/E11882_01/server.112/e25523/part_admin002.htm, last viewed on Nov. 6, 2014, 60 pgs.

* cited by examiner

ASYNCHRONOUS GLOBAL INDEX MAINTENANCE DURING PARTITION MAINTENANCE

FIELD OF THE DISCLOSURE

The present disclosure relates to databases and, more particularly, to maintaining a global index in response to a partition maintenance operation.

BACKGROUND

In relational database management systems, information is stored in tables where each piece of data is stored at a particular row and column. In general, all of the information in a given row is associated with a particular object, and all of the information in a given column relates to a particular category of information. For example, each row of a table may correspond to a particular employee, and the various columns of the table may correspond to employee names, employee social security numbers, and employee salaries.

A user retrieves information from and updates a database by submitting queries to a database management system (DBMS). The DBMS processes the queries by retrieving the information and performing the updates specified in the queries. A transaction is a unit of work that is performed within a DBMS. Each unit of work performed in a database must either complete in its entirety or have no effect whatsoever. Thus, a partial completion of a transaction is not possible. A transaction typically includes a series of queries or statements submitted to the DBMS for sequential execution.

Partition

In conventional relational database tables, rows are inserted into the table without regard to any type of ordering. Consequently, when a user submits a query that selects data from the table based on a particular value or range of values, the entire table may have to be scanned to ensure that all rows that satisfy the criteria are identified. Partitioning is a technique that, in certain situations, avoids the need to search an entire table (or other database object).

With partitioning, an object, such as a database table, is divided up into sub-tables, referred to as "partitions". Examples of types of partitioning include range, hash, and list partitioning, the most common of which is range partitioning. With range partitioning, each individual partition corresponds to a particular range of values for one or more columns of the table. For example, one column of a table may store date values that fall within a particular year, and the table may be divided into twelve partitions, each of which corresponds to a month of that year. All rows that have a particular month in the date column would then be inserted into the partition that corresponds to that month. In this example, partitioning the table will increase the efficiency of processing queries that select rows based on the month contained in the date column. For example, if a particular query selected all rows where months equals January, then only the partition associated with the month of January would have to be scanned.

Typically, the one or more criteria used to partition a database object are specified in the statement that creates the database object. For example, the following Structured Query Language (SQL) statement creates a table "sales" that is range partitioned based on date values contained in a column named "saledate":

```
create table sales
    (saledate DATE,
    productid NUMBER, ...)
    partition by range (saledate)
        partition sal94Q1 values less than to_date (yy-mm-dd,
            '94-04-01')
        partition sal94Q2 values less than to_date (yy-mm-dd,
            '94-07-01')
        partition sal94Q3 values less than to_date (yy-mm-dd,
            '94-10-01')
        partition sal94Q4 values less than to_date (yy-mm-dd,
            '95-01-01')
```

Execution of this statement creates a table named "sales" that includes four partitions: sal94Q1, sal94Q2, sal94Q3, and sal94Q4. The partition named sal94Q1 includes all rows that have a date less than 94-04-01 in their saledate column. The partition named sal94Q2 includes all rows that have a date greater than or equal to 94-04-01 but less than 94-07-01 in their saledate column. The partition named sal94Q3 includes all rows that have a date greater than or equal to 94-07-01 but less than 94-10-01 in their saledate column. The partition named sal94Q4 includes all rows that have a date greater than or equal to 94-10-01 but less than 95-01-01 in their saledate column.

Global Index

A partitioned table may be associated with two types of indexes: one or more local indexes and one or more global indexes. A local index is an index that contains index entries for only rows of a single partition. A global index is an index that contains index entries for all rows of a table. Thus, some rows indexed by a global index may reside in one partition and other rows indexed by the global index may reside in another partition.

"Drop partition" is an example of a database operation that may be performed on a partition. If a global index exists for a partition, then dropping the partition involves deleting all entries in the global index that correspond to the partition. However, deleting all such entries may take a significant amount of time if the partition is relatively large and/or many processes that are executing queries are attempting to use the global index. Such processes may be blocked while another process scans the global index, identifying which entries correspond to the dropped partition and deleting those entries. During such an operation, the database may appear inaccessible to applications and users attempting to update or access data in the database.

Another drawback of deleting all entries in a global index that correspond to a dropped partition is the generation of undo and redo for each deleted index entry. If the dropped partition contained thousands or millions of rows, then thousands or millions of undo and redo records will be generated.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

According to techniques described herein, a global index is maintained asynchronously in response to a partition being dropped. In response to an instruction to drop a partition, partition identification data that indicates an identifier that identifies the partition is stored. The index entries in the global index that correspond to the dropped partition become "orphaned" entries. Later, an execution plan for a query is processed, where the execution plan targets a global index. During execution of the execution plan, one or more index entries are accessed. For each accessed index entry, the partition identification data is analyzed to determine if the index entry is an orphaned entry. If so, then the index entry is ignored for purposes of the query.

Later, the global index may be updated to delete each orphaned entry. Such deletion may occur much later, such as during a time when the database is not queried or updated frequently.

Dropping a Partition

Figure 1:
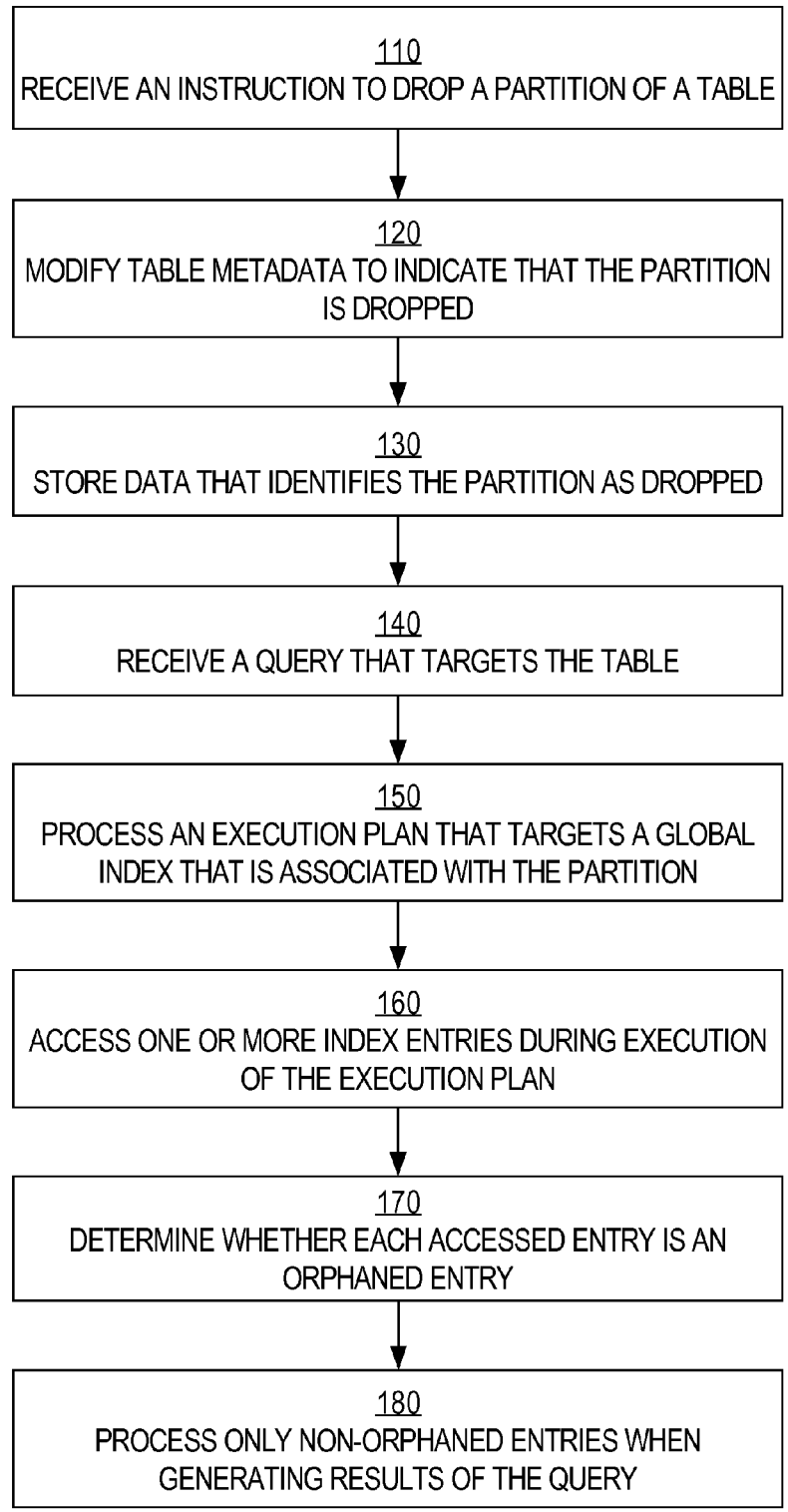
FIG. 1 is a flow diagram that depicts a process for processing an instruction to delete or drop a partition, in an embodiment.

FIG. 1 is a flow diagram that depicts a process 100 for processing an instruction to delete or drop a partition, in an embodiment. Process 100 may be performed by a database server process that is executing within a database management system that includes a database that may reside on a single storage device or may be distributed among multiple storage devices. The database server that accesses the database may execute on a single node (or computing device) or may be distributed among multiple nodes (a multi-node database server), each of which has access to the database or portions thereof.

At block 110, a drop partition instruction is received. The instruction may be in the form of a database statement that is submitted by a database administrator. The drop partition instruction may indicate only one partition or may indicate multiple partitions. If the drop partition instruction indicates multiple partitions, then the multiple partitions may be from the same table or from different tables. For example, a drop partition statement may specify partitions P1 and P3 from table T1 and partition P1 from table T2.

At block 120, table partition metadata that includes information about one or more partitions of a table is updated to indicate that the partition is dropped. For example, table partition metadata may identify, for table T1, partitions P1, P2, P3, and P4 and may indicate that partition P3 is dropped. The table partition metadata may affirmatively indicate that partitions P1, P2, and P4 are "active" or not dropped. Alternatively, the absence of affirmative dropping indications associated with partitions P1, P2, and P4 may be construed as those partitions remaining "active."

Block 120 may also involve deleting each row (or entry) in the dropped partition. Such a process may be performed by a separate (e.g., background) process. Alternatively, deleting each entry may occur later, such as sometime after block 130 or even after process 100 ends.

At block 130, drop partition metadata that identifies the partition is created and stored. The drop partition metadata may or may not be associated with a particular global index. A partition may be indexed by multiple global indexes. Thus, if each global index is associated with separate drop partition metadata, then block 130 may involve updating drop partition metadata of each global index that indexes values from the dropped partition. Alternatively, the drop partition metadata is associated with multiple global indexes.

Embodiments are not limited to any particular type of index. Examples of indexes include B-tree indexes and an index organized table (IOT).

The drop partition metadata may include an object identifier that uniquely identifies the partition relative to other objects in the same database. The drop partition metadata may also identify other partitions that may have been dropped previously (or that are dropped as part of the current drop partition instruction" and that have corresponding orphaned entries in one or more global indexes.

Blocks 110-130 may be performed within a single transaction. Thus, transactions that began before the single transaction commits will "see" that the partition is not dropped and may involve accessing any global indexes associated with the partition. Transactions that begin after the single transaction commits will "see" that the partition is dropped and, if those transactions target the global index, may involve accessing the drop partition metadata.

At block 140, a query that targets the table that formally contained the dropped partition is received. The query may be an original query that is submitted by a user or application or may be a rewritten query that was generated by a query rewrite engine and that targets the global index. The query may select entire rows or certain columns from the table upon which the global index is based.

At block 150, an execution plan (for the query) that targets a global index is processed. The execution plan may have been generated in response to receiving the query in block 140. Alternatively, the execution plan may have been generated for a previous query that is semantically equivalent to the query received in block 140. In the latter scenario, the execution plan is "shareable."

At block 160, during execution of the execution plan, one or more index entries are accessed. For example, the query may request SSNs of employees whose salaries are over $50,000 and under $60,000 and whose last name is "Smith." The global index may be on a "Last Name" column of an employee table that also includes columns for SSN and Salary. The global index is accessed to identify multiple index entries that have a value of "Smith."

At block 170, for each accessed index entry, it is determined whether the index entry is an "orphaned" entry. An "orphaned" entry is one that belongs to or is associated with a partition that was dropped. One index entry may contain one or more row identifiers, each of which identifies a partition of the indexed table that stores a row containing the value, of the indexed column, that corresponds to the index entry. Block 170 may involve, for each identified partition associated with each accessed index entry, whether that partition is identified in the drop partition metadata, which may include multiple object identifiers of partitions that have been dropped.

At block 180, only those index entries that are not orphaned entries are used to identify results of the query. The index entries that are orphaned are filtered out or essentially ignored.

Process 100 is performed without deleting some (or any) entries (that correspond to the dropped partition) in the global index. Thus, the global index does not need to be locked for a significant amount of time.

Asynchronous Index Maintenance

While a single check to determine whether an index entry is an orphaned entry is relative fast, performing thousands or millions of such checks requires a significant amount of processing to the database system, although amortized over a significant period of time. Eventually, it may be desirable to update the global index to remove the orphaned entries.

In an embodiment, a global index that includes orphaned entries is updated to remove at least a subset of the orphaned entries. Updating an index in a transaction that is different than the transaction that modifies the underlying data (e.g., in a table or partition upon which the index is based) is referred to as "asynchronous index maintenance."

In an embodiment, after all orphaned entries are removed from a global index, orphan-free metadata that indicates that the global index contains no orphaned entries is stored. The orphan-free metadata may simply be the absence of any partition identifiers in drop partition metadata for the global index. Thus, if the drop partition metadata for a global index is empty or null, then it is determined that the global index does not include any orphaned entries.

Subsequently, during execution of a query execution plan, the orphan-free metadata (or drop partition metadata) is analyzed to determine that an orphan check does not need to be performed on any index entry that is identified as a result of executing the execution plan. Thus, an orphan check may be avoided altogether. If orphan-free metadata is not stored for a particular global index (or if drop partition metadata for the particular global index identifies at least one partition), then the orphan check is performed.

A global index may be updated to remove one or more orphaned entries. Such a "clean up" operation may be performed at a time that is scheduled by a database administrator (DBA) or at a time that is based on database activity or usage. For example, a DBA may schedule orphan removal at the midnight that follows a drop of a partition. As another example, the removal of orphaned entries may begin if it is determined that CPU usage is less than 25% and memory usage is less than 10%.

In an embodiment, asynchronous index maintenance is performed using multiple transactions. For example, a first transaction begins. Within the first transaction, multiple "mini-" transactions (also referred to as "sub transactions") are initiated. Each sub transaction involves removing one or more (but not all) orphaned entries. In this way, if, for example, ten sub transactions commit and then the first (or "outer") transaction fails, then the changes made by those ten sub transactions do not need to be undone. Another benefit of this approach is that a small number of undo records and redo records are generated for each sub transaction. Thus, the memory that is used to store undo and redo information for one sub transaction may be reused for another sub transaction. If only a single transaction is used to remove all orphaned entries from a global index, then a significant portion of volatile memory may be required to simultaneously store all the undo records and redo records that would be generated for the single large transaction before being written to non-volatile storage upon commit of that transaction.

Coalescing

In an embodiment, asynchronous index maintenance involves "coalescing." "Coalescing" refers to changing where index entries are stored in data blocks. For example, if two index entries can fit into a single data block and data block DB1 contains non-orphaned entry E1 and orphaned entry E2 and data block DB2 contains non-orphaned entry E3 and orphaned entry E4, then entry E3 from DB2 may be written over entry E2 in DB1. After this "coalescing," DB1 contains entries E1 and E3. Also, DB2 is then available to store two other non-orphaned entries.

Figure 2:
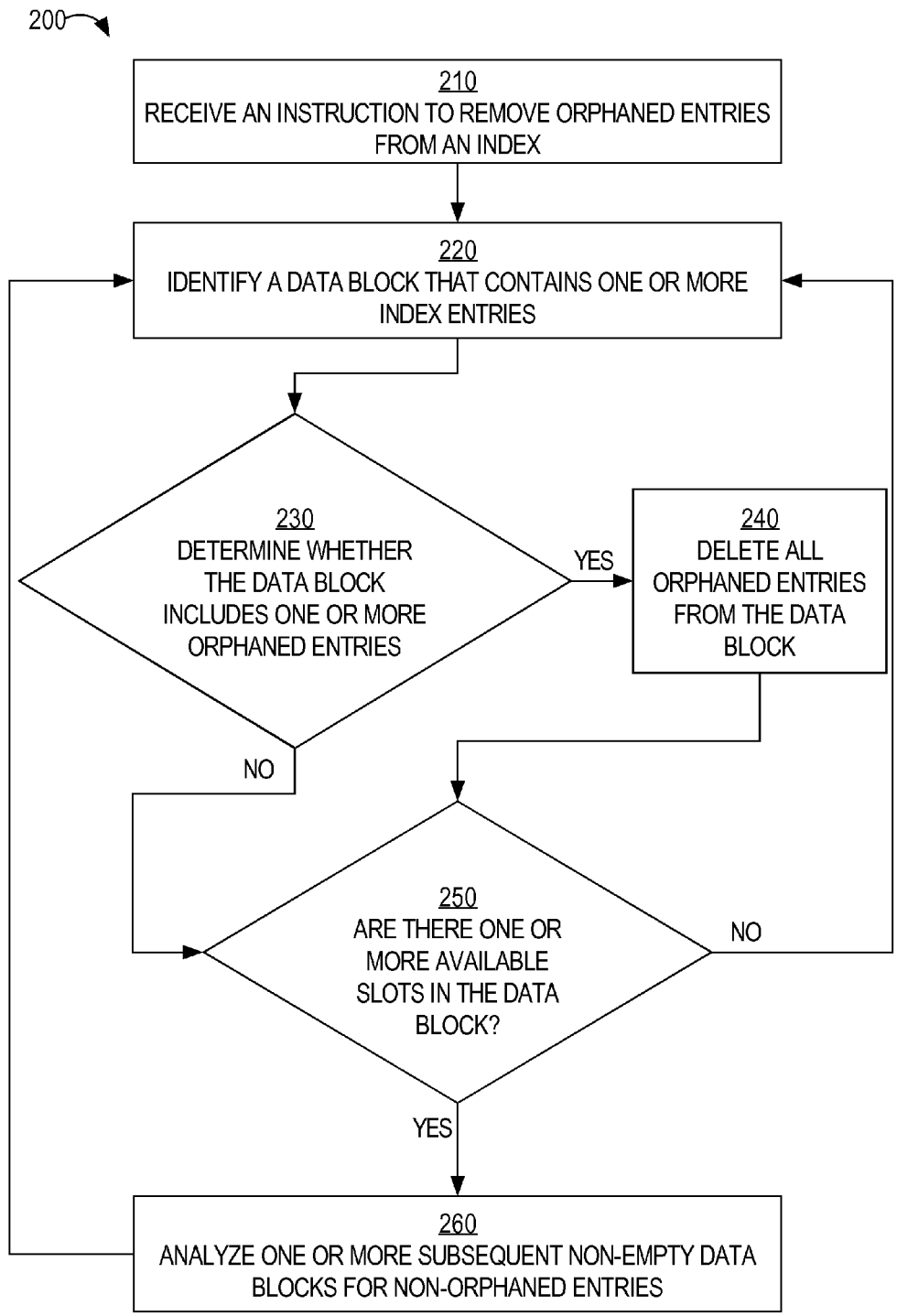
FIG. 2 is a flow diagram that depicts a process for removing orphaned entries from a global index, in an embodiment.

FIG. 2 is a flow diagram that depicts a process 200 for removing orphaned entries from a global index, in an embodiment.

At block 210, an instruction is received to "clean up" or coalesce data blocks. While such an instruction does not explicitly call for removal of orphaned data blocks, processing this instruction may involve orphaned entry removal.

Alternatively, the instruction may be an explicit instruction to remove orphaned entries from one or more global indexes. The instruction may specify a list of one or more partitions, a list of one or more global indexes, or may simply request orphan removal. Additionally, the instruction may be to remove all orphaned entries from one or more global indexes or may be to remove a subset of the orphaned entries from the global index. For example, the instruction may specify a partition or criteria that orphaned entries must satisfy in order for the orphaned entry to be removed. Example criteria may be a range of values (e.g., between "Sm*" and "Sne*") into which the data value of each orphaned entry must fall in order for the orphaned entry to be deleted or otherwise removed from the global index.

At block 220, a data block that contains one or more index entries is identified. The first iteration of block 220 may involve identifying the first index entry in a global index. If data blocks are not stored contiguously in storage, then each data block may contain a pointer or reference that points to a subsequent or adjacent data block. Process 200 may involve storing a variable or pointer that is used to identify the current data block that is being considered as a candidate for coalescing.

Block 220 may involve obtaining a lock on the data block so that no other processes can perform an operation on the data block while the data block is being modified. Thus, process 200 may involve obtaining many individual locks of relatively short duration.

At block 230, it is determined whether the data block includes one or more orphaned entries. Block 230 may involve identifying an object identifier associated with each index entry and determining whether the object identifier is included in drop partition metadata. If the determination at block 230 is true, then process 200 proceeds to block 240. Otherwise, process 200 proceeds to block 250.

At block 240, each orphaned entry identified in block 230 is deleted from the data block.

At block 250, it is determined whether the number of available slots in the data block is greater than zero. An "available slot" in a data block is space that is large enough to fit an index entry. If the number identified in block 250 is zero, then the data block is not a candidate for coalescing and process 200 proceeds to the next data block (at block 220). Prior to proceeding to block 250, block 250 may involve releasing the lock (that was obtained in block 220) on the data block.

If the number identified in block 250 is one or higher, then process 200 proceeds to block 260.

At block 260, one or more subsequent non-empty data blocks are analyzed for one or more non-orphaned entries. For example, if the number of available slots in a data block is four, then four non-orphaned entries in one or more subsequent data blocks are identified.

Process 200 continues until there are no more non-orphaned entries to process. If the number of non-orphaned entries is less than the number of available slots, then, after the current data block is updated, process 200 may end by storing data that frees up the remaining data blocks, since the remaining data blocks do not contain any non-orphaned entries. Also, the last data block to include a non-orphaned entry may be updated to modify its adjacent data block reference or pointer to be zero or NULL, indicating that the last data block is the last data block in the global index.

Unique Indexes

A global index may be unique. A "unique" index is one in which no two indexed values can be the same. Thus, the column that is indexed by the global index contains only unique values. Alternatively, an index may be non-unique but later a unique constraint is added to the index and is enforced during inserts to the index. For unique indexes (or non-unique indexes with a unique constraint), an insert of a data value into the indexed column may involve determining whether any index entries in the index already includes the data value.

If orphaned entries are treated as any other non-orphaned entry in a global index, then many inserts might not be inserted due to a determination that the values indicated by the orphaned entries are already indexed. Therefore, in an embodiment, in response to an insert instruction to insert a data value into a global index, partition drop metadata is analyzed to determine whether to insert the data value.

Figure 3:
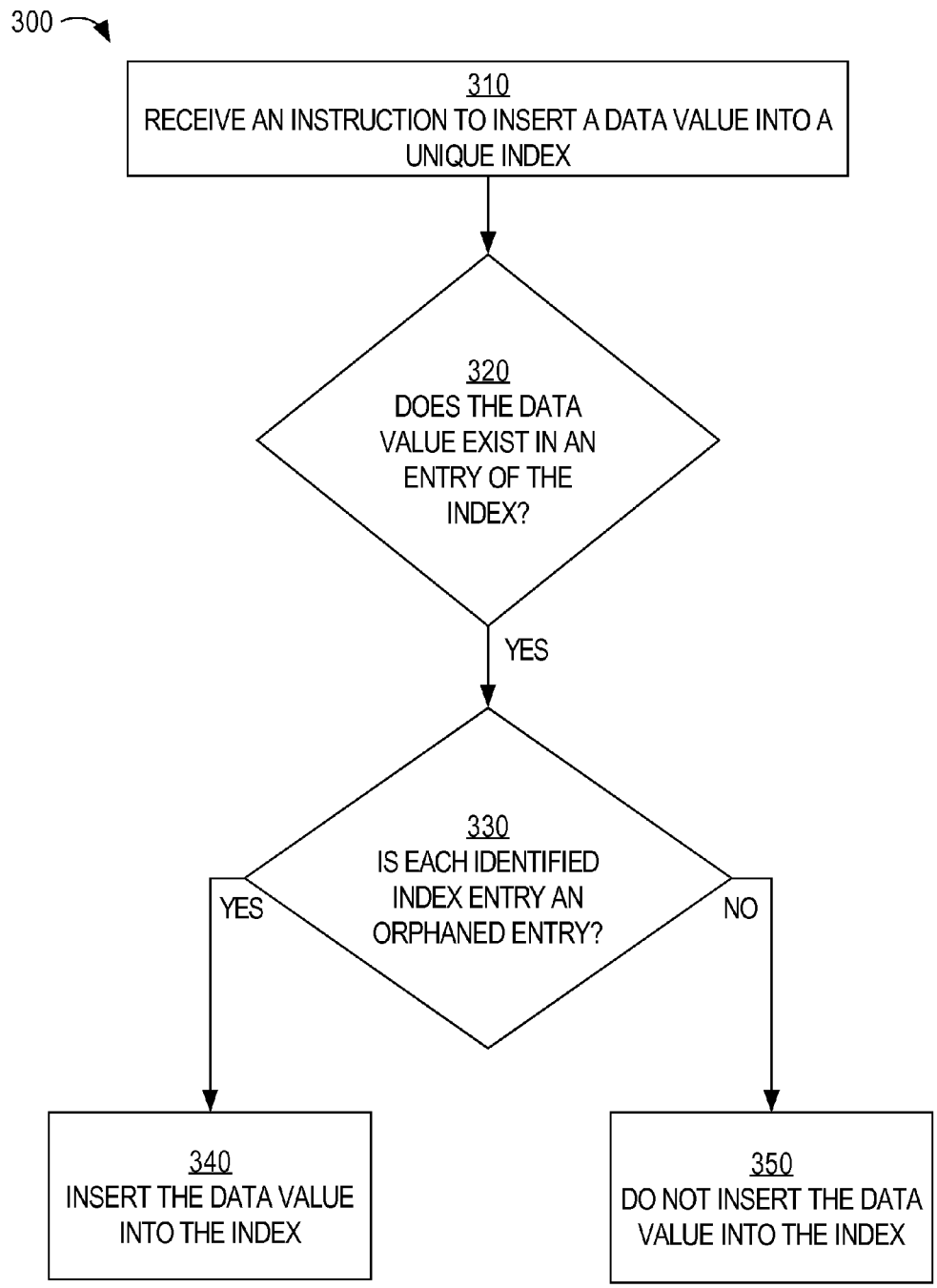
FIG. 3 is a flow diagram that depicts a process for handling insert instructions to a global index, in an embodiment.

FIG. 3 is a flow diagram that depicts a process 300 for handling insert instructions to a global index, in an embodiment.

At block 310, an instruction to insert a data value into a unique global index is received. The instruction may be in the form of a database statement submitted by a user or an instruction generated by a database server process that processed an insert statement that targets a table upon which the global index is based. The instruction may be to insert multiple data values. In that case, the following blocks may be performed for each data value that is to be inserted.

At block 320, it is determined whether the data value exists in the global index. Block 320 may involve using the data value to traverse the index and arrive at one or more index entries, and check each index entry to determine whether the index entry includes the data value. If one of the identified index entries includes the data value, process 300 proceeds to block 330. It may be possible that the global index includes multiple index entries with the same data value, in which case multiple index entries are identified.

At block 330, it is determined whether each of the identified index entries is an orphaned entry. If so, then, at block 340, the data value is inserted. Otherwise, at block 350, the data value is not inserted.

If multiple data values are part of the insert instruction, then blocks 320-340 are repeated for each of the other data values.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
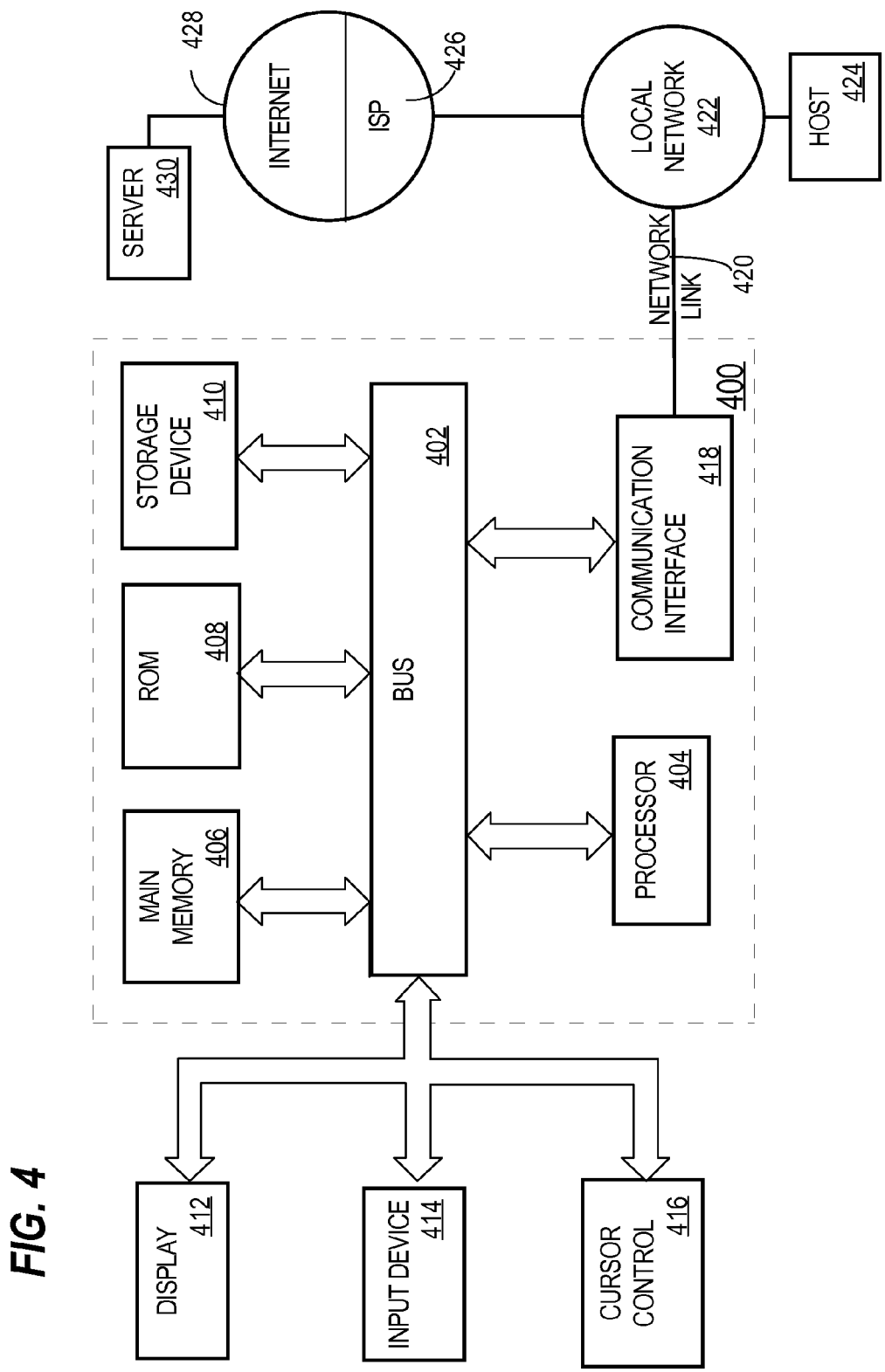
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving an instruction to drop a partition;
   in response to receiving the instruction, storing drop data that identifies the partition;
   receiving a query;
   in response to receiving the query:
      traversing an index that comprises a plurality of index entries;
      wherein the plurality of index entries includes a first index entry that references a first row in the partition;
      wherein the plurality of index entries includes a second index entry that is different than the first index entry and that references a second row in the partition;
      wherein traversing the index comprises, for each index entry of two or more of the plurality of index entries:
         determining, based on the drop data, whether said each index entry is associated with the partition,
         filtering out said each index entry if it is determined, based on the drop data, that said each index entry is associated with the partition;
   wherein the method is performed by one or more computing devices.

2. The method of claim 1, wherein:
   the instruction indicates a plurality of partitions that includes the partition;
   the drop data identifies the plurality of the partitions in response to receiving the instruction.

3. The method of claim 2, wherein a first partition of the plurality of partitions is from a first table and a second partition of the plurality of partitions is from a second table that is different than the first table.

4. The method of claim 1, further comprising:
in response to receiving a second query:
traversing a second index that is different than the index and comprises a second plurality of index entries;
for each index entry in a second subset of the second plurality of index entries, determining, based on the drop data, whether said each index entry is associated with the partition;
filtering out said each index entry if it is determined, based on the drop data, that said each index entry is associated with the partition.

5. The method of claim 1, wherein storing the drop data is performed within a database transaction and receiving the query is performed after the database transaction commits.

6. The method of claim 5, wherein:
the database transaction is a first database transaction;
the method further comprising updating the index within a second database transaction that begins after the first database transaction committed.

7. The method of claim 6, wherein updating the index comprises:
for each index entry of the plurality of index entries:
determining whether said each index entry is associated with a partition that is indicated in the drop data;
if it is determined that said each index entry is associated with a partition that is indicated in the drop data, then deleting said each index entry.

8. The method of claim 7, wherein updating comprises:
for a third index entry in the plurality of index entries, beginning a third transaction that is a first sub transaction of the second database transaction;
within the third transaction:
determining that the third index entry is associated with a partition that is indicated in the drop data;
in response to determining that the third index entry is associated with a partition that is indicated in the drop data, deleting the third index entry;
committing the third transaction;
after committing the third transaction, beginning a fourth transaction for a fourth index entry, in the plurality of index entries, that is different than the third index entry;
within the fourth transaction that is a second sub transaction of the second database transaction:
determining that the fourth index entry is associated with a partition that is indicated in the drop data;
in response to determining that the fourth index entry is associated with a partition that is indicated in the drop data, deleting the fourth index entry;
committing the fourth transaction.

9. The method of claim 1, wherein the index is based on a column that has a uniqueness constraint, further comprising:
receiving an insert instruction to insert one or more values into the index;
in response to receiving the insert instruction:
determining whether each value of the one or more values is included in an index entry of the index;
in response to determining that a first value of the one or more values is included in a particular index entry of the index, determining whether the particular index entry is associated with a partition that is indicated in the drop data;
if it is determined that the particular index entry is not associated with a partition that is indicated in the drop data, then determining not to add the first value to the index.

10. The method of claim 9, further comprising:
in response to determining that a second value of the one or more values is included in a third index entry of the index, determining whether the third index entry is associated with a partition that is indicated in the drop data;
if it is determined that the third index entry is associated with a partition that is indicated in the drop data, then determining that the second value is a candidate for insertion into the index.

11. A method comprising:
receiving an instruction to drop a first partition of a table that comprises a plurality of partitions and that is associated with a global index;
in response to receiving the instruction to drop the first partition of the table that is associated with the global index and without scanning the global index for entries that correspond to the first partition, storing partition data that identifies the first partition;
after storing the partition data, receiving a query;
in response to receiving the query:
identifying one or more entries in the global index;
wherein the global index includes (a) a first index entry that references the first partition and (b) a second index entry that references a second partition, of the plurality of partitions, that is not dropped;
for each entry of the one or more entries:
determining whether said each entry is associated with an identifier that identifies the first partition,
if it is determined that said each entry is associated with an identifier that identifies the first partition, then filtering out said each entry;
wherein the method is performed by one or more computing devices.

12. The method of claim 11, further comprising:
scanning a plurality of entries in the global index;
wherein scanning the plurality of entries comprises, for each entry of the plurality of entries:
determining whether said each entry is associated with an identifier that matches the partition data;
if it is determined that said each entry is associated with an identifier that matches the partition data, then updating a data block that includes said each entry by deleting said each entry from the data block.

13. One or more storage media storing instructions which, when executed by one or more processors, cause:
receiving an instruction to drop a partition;
in response to receiving the instruction, storing drop data that identifies the partition;
receiving a query;
in response to receiving the query:
traversing an index that comprises a plurality of index entries;
wherein the plurality of index entries includes a first index entry that references a first row in the partition;
wherein the plurality of index entries includes a second index entry that is different than the first index entry and that references a second row in the partition;
wherein traversing the index comprises, for each index entry of two or more of the plurality of index entries:
determining, based on the drop data, whether said each index entry is associated with the partition,
filtering out said each index entry if it is determined, based on the drop data, that said each index entry is associated with the partition.

14. The one or more storage media of claim 13, wherein:
the instruction indicates a plurality of partitions that includes the partition;
the drop data identifies the plurality of partitions in response to receiving the instruction.

15. The one or more storage media of claim 14, wherein a first partition of the plurality of partitions is from a first table and a second partition of the plurality of partitions is from a second table that is different than the first table.

16. The one or more storage media of claim 13, wherein the instructions, when executed by the one or more processors, further cause:
in response to receiving a second query:
traversing a second index that is different than the index and comprises a second plurality of index entries;
for each index entry in a second subset of the second plurality of index entries, determining, based on the drop data, whether said each index entry is associated with the partition;
filtering out said each index entry if it is determined, based on the drop data, that said each index entry is associated with the partition.

17. The one or more storage media of claim 13, wherein storing the drop data is performed within a database transaction and receiving the query is performed after the database transaction commits.

18. The one or more storage media of claim 17, wherein:
the database transaction is a first database transaction;
the instructions, when executed by the one or more processors, further cause updating the index within a second database transaction that begins after the first database transaction committed.

19. The one or more storage media of claim 18, wherein updating the index comprises:
for each index entry of the plurality of index entries:
determining whether said each index entry is associated with a partition that is indicated in the drop data;
if it is determined that said each index entry is associated with a partition that is indicated in the drop data, then deleting said each index entry.

20. The one or more storage media of claim 19, wherein updating comprises:
for a third index entry in the plurality of index entries, beginning a third transaction that is a first sub transaction of the second database transaction;
within the third transaction:
determining that the third index entry is associated with a partition that is indicated in the drop data;
in response to determining that the third index entry is associated with a partition that is indicated in the drop data, deleting the third index entry;
committing the third transaction;
after committing the third transaction, beginning a fourth transaction for a fourth index entry, in the plurality of index entries, that is different than the third index entry;
within the fourth transaction that is a second sub transaction of the second database transaction:
determining that the fourth index entry is associated with a partition that is indicated in the drop data;
in response to determining that the fourth index entry is associated with a partition that is indicated in the drop data, deleting the fourth index entry;
committing the fourth transaction.

21. The one or more storage media of claim 13, wherein the index is based on a column that has a uniqueness constraint, wherein the instructions, when executed by the one or more processors, further cause:
receiving an insert instruction to insert one or more values into the index;
in response to receiving the insert instruction:
determining whether each value of the one or more values is included in an index entry of the index;
in response to determining that a first value of the one or more values is included in a particular index entry of the index, determining whether the particular index entry is associated with a partition that is indicated in the drop data;
if it is determined that the particular index entry is not associated with a partition that is indicated in the drop data, then determining not to add the first value to the index.

22. The one or more storage media of claim 21, wherein the instructions, when executed by the one or more processors, further cause:
in response to determining that a second value of the one or more values is included in a third index entry of the index, determining whether the third index entry is associated with a partition that is indicated in the drop data;
if it is determined that the third index entry is associated with a partition that is indicated in the drop data, then determining that the second value is a candidate for insertion into the index.

23. One or more storage media storing instructions which, when executed by one or more processors, cause:
receiving an instruction to drop a first partition of a table that comprises a plurality of partitions and that is associated with a global index;
in response to receiving the instruction to drop the first partition of the table that is associated with the global index and without scanning the global index for entries that correspond to the first partition, storing partition data that identifies the first partition;
after storing the partition data, receiving a query;
in response to receiving the query:
identifying one or more entries in the global index;
wherein the global index includes (a) a first index entry that references the first partition and (b) a second index entry that references a second partition, of the plurality of partitions, that is not dropped;
for each entry of the one or more entries:
determining whether said each entry is associated with an identifier that identifies the first partition,
if it is determined that said each entry is associated with an identifier that identifies the first partition, then filtering out said each entry.

24. The one or more storage media of claim 23, wherein the instructions, when executed by the one or more processors, further cause:
scanning a plurality of entries in the global index;
wherein scanning the plurality of entries comprises, for each entry of the plurality of entries:
determining whether said each entry is associated with an identifier that matches the partition data;
if it is determined that said each entry is associated with an identifier that matches the partition data, then updating a data block that includes said each entry by deleting said each entry from the data block.

* * * * *